Sept. 1, 1931.  A. P. HORNOR ET AL  1,821,549
APPARATUS FOR DEHYDRATING AND PURIFYING GASES
Filed Jan. 15, 1927
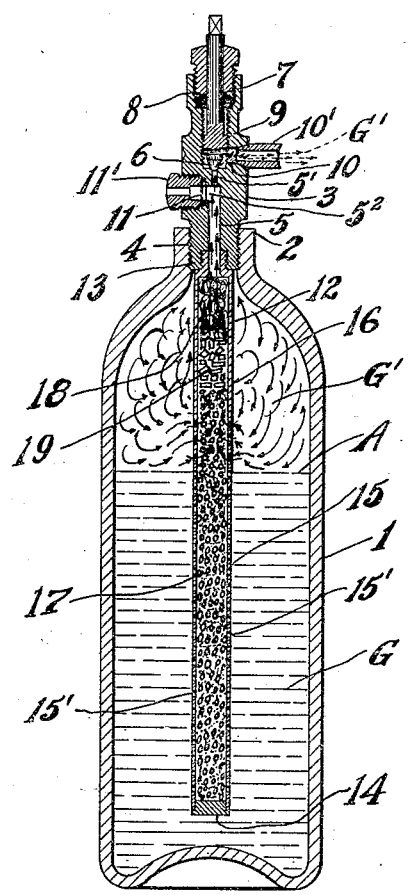
INVENTORS
Aurelius P. Hornor and
Clyde B. Gardenier
BY Henry Lanahan
ATTORNEY Patented Sept. 1, 1931

1,821,549

UNITED STATES PATENT OFFICE

AURELIUS P. HORNOR, OF CALDWELL, AND CLYDE B. GARDENIER, OF BELLEVILLE, NEW JERSEY, ASSIGNORS TO E.-K. MEDICAL GAS LABORATORIES, INCORPORATED, OF WEST ORANGE, NEW JERSEY, A CORPORATION OF NEW JERSEY

APPARATUS FOR DEHYDRATING AND PURIFYING GASES

Application filed January 15, 1927. Serial No. 161,388.

Our invention relates to dehydrating and purifying gases, such as those ordinarily introduced under pressure into suitable containers which are then shipped to the various points where the gases are to be used.

Our invention is especially applicable to the dehydration and purifying of gases such as are commonly employed for anaesthetic agents, and while the invention will be particularly described in connection with nitrous oxide, it is to be distinctly understood that the same is equally well adapted for effecting the dehydration and purification of ethylene, acetylene, carbon dioxide and other gases.

Nitrous oxide gas produced for anaesthetic purposes is introduced under pressure into strong shipping containers or cylinders. Before the containers are filled with the nitrous oxide gas, the latter is usually treated to remove the water content therefrom. However, a slight amount of water generally remains in the nitrous oxide gas as introduced into the shipping containers and frequently there are also small quantities of water present in the containers before the nitrous oxide is introduced therein. Accordingly, in administering nitrous oxide gas, where it is desirable to maintain an uninterrupted flow of the gas over an extended period, there is likely to be sufficient moisture present in the gas to result in the formation of frost at the reducing valve or other mechanism where the gas is reduced from the pressure under which it is maintained in the shipping container, to a lower pressure suitable for administration to the patient. The frost thus formed has a tendency to produce an uneven flow of gas, and sometimes is sufficient to check the flow entirely.

As introduced into the shipping container, a gas such as described is also likely to contain various organic impurities such, for example, as hydrazine, hydroxylamine and oils, and while the amounts of such impurities are generally very slight, they are often sufficient to impart to the gas organic odors which are more or less objectionable. The presence of these impurities is often due, in part at least, to the lubricant used in the pump or compressor which is employed for compressing the gas prior to its introduction into the shipping container or cylinder.

The principal object of our invention is to prevent the formation of frost in the valve or other mechanism where, as described above, the gas, upon being withdrawn from a cylinder or container is reduced to a pressure suitable for its administration or other use, so that a uniform uninterrupted flow of the gas from such a container may be maintained for any desired length of time.

Another object of our invention is to effectively remove from the gas impurities such as referred to above, whereby upon withdrawal of the gas from the container for administration or other use, it will be clean and odorless.

Generally described, our invention resides in the provision of simple and effective means, preferably embodied in or combined with the shipping container or cylinder for the gas, for attaining the foregoing results.

Our invention also resides in an improved method of dehydrating and purifying and deodorizing nitrous oxide and other gases, which is preferably dependent upon the use of pressure shipping containers for holding such gases.

Other objects and features of our invention will be hereinafter more fully described and claimed.

In order that our invention may be more clearly understood, attention is directed to the drawing accompanying and forming a part of this specification and in which the single figure is a central vertical sectional view, partly in elevation, of a shipping container or cylinder filled or charged with nitrous oxide or other gas and embodying means in accordance with our invention for effecting the dehydration and purification and deodorizing of such gas.

Referring to the drawing, reference character 1 represents a shipping container for nitrous oxide or other gas, having a neck 2 into which the lower reduced end portion of a valve casing 3 is threaded, as indicated at 4. The casing 3 is provided with a central cylindrical bore having a lower portion 5, an intermediate reduced portion 5' and an upper enlarged screw-threaded portion. Reference character 6 represents a valve formed on the lower end of a rod 7, this rod extending upwardly from the valve casing 3 through a suitable stuffing box 8 and having an enlarged portion 9 adjacent the valve 6 which is in screw-threaded engagement with the upper portion of the bore of the casing 3. The valve 6 coacts with a seat provided at the upper end of the reduced portion 5' of the bore in the casing 3, to control the communication of the said reduced portion 5' with an opening 10 extending laterally from the said bore through the wall of said casing at a point just above the said reduced portion 5'. Reference character 10' represents a tube which may lead to a suitable reducing valve and the end of which is suitably secured with a fluid-tight joint against a seat provided on the casing 3 about the outer end of the opening 10. Just below the reduced portion 5' of the bore thereof, the casing 3 is provided with an opening 5² extending laterally from said bore out through the wall of the casing. The opening 5² has an enlarged outer end portion, and a safety device consisting of a thin copper diaphragm 11 is secured in place against the shoulder provided at the inner end of said enlarged outer end portion by means of a suitable hollow plug 11' threaded into the latter.

Reference character 12 represents a long tubular member which is secured to the valve casing 3 as by having its upper end portion 13 reduced and threaded into the lower end of the central bore of the casing 3. The member 12 is open at its upper end where it communicates with the bore of the casing 3, is preferably of such a length that it reaches nearly to the bottom of the container 1, and has its lower end closed by a suitable plug 14. This tubular member comprises a relatively long section 15 having numerous closely adjacent perforations 15' extending through the wall thereof, and a short upper imperforate section 16. The member 12 is filled to a point considerably above the uppermost of the perforations 15' with a mass of a suitable dehydrating agent or material 17, and above the latter with successive layers or masses of a suitable purifying and deodorizing material 19 and suitable screening or filtering means 18, the purifying and deodorizing material being preferably, though not necessarily, disposed between the dehydrating material and the screening or filtering means. Where nitrous oxide constitutes the gas introduced into the container, the dehydrating material 17 preferably consists of calcium chloride, the purifying and deodorizing material 19 consists of a suitable organic absorbent, such as potassium permanganate, but preferably of any of a number of forms of carbon, such as activated carbon, charcoal, bone-black, and coke, and the screening or filtering means 18 may consist of a closely packed mass of fibrous material such as asbestos or mineral wool.

The container shown and described herein, has a combined inlet and outlet comprising the passageway consisting of the bore of the valve casing 3 and the opening 10, and controlled by the valve 6. Our invention, however, as to some of its features, is also applicable to containers provided with separate inlets and outlets. In filling the container 1 with nitrous oxide gas, the valve 6 is opened, the desired amount of gas is introduced into the container through the opening 10 and the valve is then closed. The gas in entering the container passes from the bore of the valve casing 3 into the upper or imperforate section 16 of the tubular member 12, through the opening provided at the upper end of the latter, and upon reaching the perforated section 15 passes out through the perforations 15' into the container. It will be apparent that upon thus filling the container with nitrous oxide gas, the latter is caused to pass through the purifying and deodorizing material 19 and also through that portion of the dehydrating material 17 which is located above the uppermost perforations 15', and accordingly some at least of the impurities and water content of the gas will then be removed. If the usual amount of nitrous oxide gas is introduced into the container, the gas in the container will upon the completion of the filling operation, be under such a pressure that at ordinary room temperature about two-thirds of the contents of the cylinder will be in the form of a liquid, and the remainder in the form of a gas. In the drawing, the container 1 is shown as thus filled with nitrous oxide, the liquid nitrous oxide being indicated at G, and the gaseous nitrous oxide at G'. The provision of member 12 with the perforated long lower section 15 ensures a very considerable portion of the nitrous oxide, depending somewhat on the agitation or circulation of the contents of the cylinder which may result from temperature changes, the handling of the cylinder, withdrawals of gas, etc., being brought into contact with the dehydrating material 17 and accordingly the removal of still more of the water content from the nitrous oxide, while the latter is maintained within the container. Whenever it is desired to withdraw nitrous oxide from the cylinder 1, in order, for example, to administer the same as an anaesthetic the tube 10' leading to a suitable reducing valve or the like (not shown), is attached to the casing 3 at the opening 10 and the valve 6 opened to such an extent as to permit the proper flow of gas from the container. The nitrous oxide gas will, of course, then flow under its own pressure from the cylinder to the reducing valve. In passing from the cylinder 1, the gas, as indicated by the arrows in the drawings, flows into the tubular member 12 through the openings 15′, and then upwardly through said member into the bore of the valve casing 3, past the valve 6 and out through the opening 10 and tube 10′. Accordingly the gas, upon thus being withdrawn from the cylinder 1, is caused to pass, preferably while still within the container 1, and under pressure, through a mass of the dehydrating material 17, then through the purifying and deodorizing material 19, and finally through the screening or filtering means 18. The withdrawal of nitrous oxide from the container results in a decrease in pressure within the container and the conversion of a certain amount of the liquid nitrous oxide into the gaseous form. This conversion of the liquid nitrous oxide into the gaseous form is accompanied with boiling of the liquid nitrous oxide at and adjacent the surface thereof, and the extraction of heat from the adjacent liquid nitrous oxide, as well as from the adjacent wall portions of the member 12 and the cylinder 1. Accordingly if the nitrous oxide is withdrawn very rapidly, any water which may be present in the liquid nitrous oxide adjacent the surface thereof is likely to be converted into small ice particles, and in the passage of the gas from the container 1, some of these ice particles, as well as particles of the dehydrating material 17 may be entrained and carried along with the gas. The filtering means 18, however, acts to remove from the gas in the passage of the latter therethrough, all such particles. Also, in the passage of the gas through the mass 19 of carbon or other organic absorbent material, the latter acts to remove and absorb practically all oil and other organic impurities which may still be present in the gas and thereby effectually purify and deodorize the latter. Accordingly, all gas withdrawn from the container will when it reaches the reducing valve or the like, be in a substantially absolutely clean, pure, odorless and dry condition.

It is to be understood that our invention, as shown and described herein, is subject to various changes and modifications without departure from the spirit thereof or the scope of the appended claims. For example, our invention is not limited in its application to an arrangement or method in which the nitrous oxide or other gas is subjected to the action of dehydrating material and passed through purifying material and screening or filtering means both upon the introduction thereof and the withdrawal thereof from the container, nor to the conjoint use of any of the dehydrating, screening or filtering and purifying materials or means, nor to the disposal of either the dehydrating material, the purifying material, or the screening or filtering means within the body of the container.

Having now described our invention which we claim as new and desire to protect by Letters Patent, is:

1. A container of the character described, provided adjacent its upper end with a valve-controlled passageway constituting an outlet, and a hollow member communicating at its upper end with said passageway, extending downwardly into the container, and comprising a lower perforated section and an upper imperforate section, said member being filled with dehydrating material to a point above said perforated section and having organic absorbent material therein above the dehydrating material and screening or filtering material therein above the organic absorbent material, substantially as described.

2. A container of the character described, having an open upper end, a valve casing extending upwardly from the container, said valve casing being in direct threaded connection at its lower end with the said open end of the container and having a valve-controlled passageway therethrough constituting an outlet for the container, a tubular member communicating with and extending downwardly from said valve casing into the container and having its upper end in direct threaded connection with the lower end of the valve casing, said tubular member comprising a lower perforated section and an upper imperforate section, the said tubular member being filled with dehydrating material to a point above the perforated section thereof and containing above said dehydrating material, a mass of fibrous screening or filtering material, substantially as described.

3. The combination of a container having a threaded opening through its upper end, a valve casing extending upwardly from the container, said valve casing having its lower end disposed in said opening and in direct threaded connection with the wall thereof and having a valve-controlled passageway there-through constituting an outlet for the container, said threaded connection constituting the sole means of attaching said casing to the container, and a hollow member communicating with and extending downwardly from said valve casing into the container, said hollow member being directly attached at its upper end to the lower end of the valve casing and being smaller in cross section than said opening so as to be adapted to be passed freely through the latter, said member having a perforated wall section and containing purifying material, substantially as described.

This specification signed this 12th day of January, 1927.

AURELIUS P. HORNOR.
CLYDE B. GARDENIER.